March 12, 1940.   B. J. LAKE   2,193,425
EARTH RETAINER
Filed Oct. 6, 1938
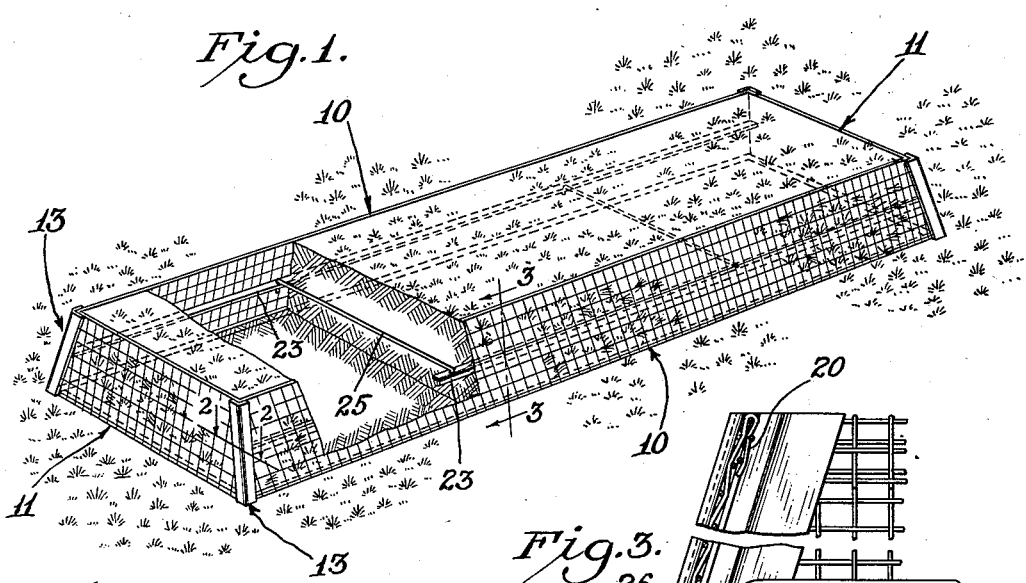
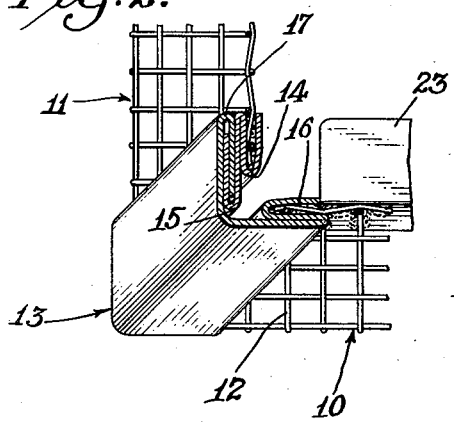
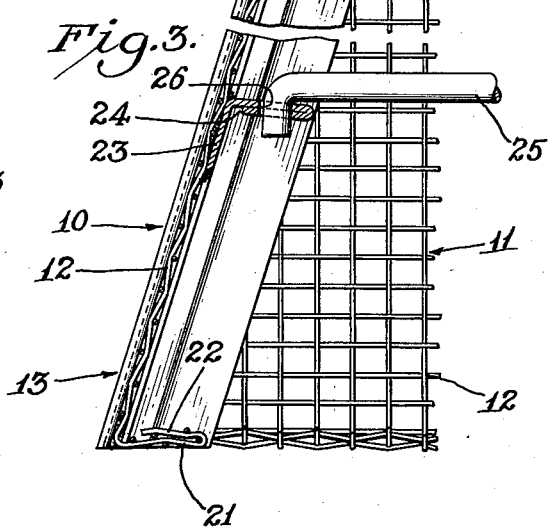
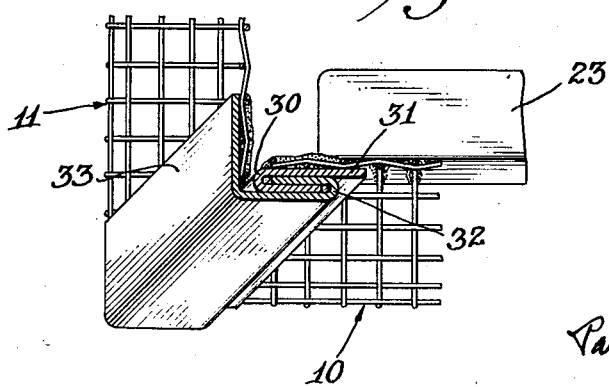
Inventor
Bruno J. Lake
BY Parker, Carlson, Pitzner & Hubbard
Attorneys.

Patented Mar. 12, 1940

2,193,425

UNITED STATES PATENT OFFICE 2,193,425

EARTH RETAINER

Bruno J. Lake, Oak Park, Ill.

Application October 6, 1938, Serial No. 233,517

3 Claims. (Cl. 47—33)

The invention relates generally to means for holding earth in place and more particularly to a device for preventing the earth on sloping surfaces from being washed away.

The general object of the invention is to provide a novel structure for preventing earth from being washed away by rains from sloping surfaces on lawns or the like, which structure permits the grass to cover it and thereby conceal it, which is made sufficiently rigid to hold any desired form, and which may be made in parts arranged to be easily assembled without the use of tools.

In a more particular sense, it is an object to provide a device for preventing the earth in the mound over a burial grave from being washed away by rains, which device holds the sloping sides of the mound permanently in the desired form and permits grass to grow on said sloping sides, thereby completely concealing the device, and which may be easily assembled without use of tools by a gardener when building the mound.

It is also an object to provide a device of the foregoing character, which comprises parts for the ends and sides of the mound so constructed that they may be readily secured to each other, thereby permitting the use of standardized parts for the sides of the mound with different end parts for use on mounds over single or double graves.

Other objects reside in the provision of a device of the foregoing character which avoids any danger of a gardener scratching his hands on the device in working in the earth adjacent thereto, and which does not interfere with cutting the grass concealing the device.

Another object is to provide a method of building a grave mound having sloping side surfaces covered by growing grass.

Other objects and advantages will become apparent from the following description taken in connection with the accompanying drawing, in which:

Figure 1 is a perspective view of a grave mound, partially in section, equipped with a device embodying the features of the invention.

Fig. 2 is an enlarged fragmentary horizontal sectional view taken on the line 2—2 of Fig. 1.

Fig. 3 is an enlarged fragmentary vertical sectional view taken on the line 3—3 of Fig. 1.

Fig. 4 is a view similar to Fig. 2 but of a modified form of the device.

It is sometimes desired to build a mound of earth over a burial grave in a cemetery, of substantially the size of the grave. One of the usual forms of such mound is a raised area having downwardly and outwardly sloping sides and ends, with the sloping surfaces thereof planted with grass and the top flat surface planted either with grass or flowers. It is of course desirable to have the sloping sides precisely formed and evenly covered with grass, but difficulty is encountered in attaining such result if a mere compacting of the earth is depended upon to maintain the form. When it rains, the flow of water from the top of the mound causes erosion of the sloping surfaces, thus destroying the preciseness of the form. Moreover, such erosion tends to expose the roots of the grass growing on the sloping surfaces so that the grass readily dies out. With the dying of the grass, still greater erosion occurs because the earth is not held by the roots of the grass.

The present device prevents such erosion and maintains the precise form of the mound. It further permits practically unrestricted growth of grass on the sloping surfaces so that the device is completely concealed, except upon close inspection. The preferred embodiment is constructed so that it may be easily assembled by a gardener without the use of tools.

As shown in the drawing, the device is made of four sections comprising two side sections, indicated generally at 10, and two end sections, indicated generally at 11. Each section comprises a strip of wire mesh 12 cut to such shape that when joined with the other sections, the desired form of mound is attained. In the preferred form each strip of wire mesh is of trapezoidal form to provide a mound having a flat top and downwardly and outwardly sloping side surfaces.

The end or slanting edges of each section are provided with means for interlocking the sections for rigidly holding them together, such means being constructed so that they may be joined without the use of tools, thus facilitating installation of the device. In the preferred form such means comprises strips of sheet metal, indicated generally at 13, secured to the end edges of the wire mesh sections and having interlocking U-shaped portions engageable by a simple sliding movement. In the preferred form of the device shown in Fig. 2 the interlocking means on the end sections 11 comprises a strip of sheet metal bent on longitudinal lines to provide a pair of U-shaped portions 14 and 15. The two U-shaped portions 14 and 15 lie side by side, and the inner U-shaped portion 14 is adapted to receive therein the end edge of the wire mesh. The U-shaped portion 14 may be flattened against the wire mesh to clamp it, and spot welding or solder can also be used to hold the wire mesh within the U-shaped portion. The strip attached to the side sections 10 comprises a U-shaped portion 16 enclosing and secured to the wire mesh similarly to the U-shaped section 14. At a right angle to the U-shaped portion 16 is a second U-shaped section 17 lying parallel to the U-shaped portion 15 of the strip on the end section 11 and opening in the opposite direction so that the U-shaped portions 15 and 17 may be fitted one within the other by a relative sliding movement longitudinal of the strips 13. Thus the sections may be attached to each other without the use of tools and are rigidly held in proper relation to each other.

To stiffen the side and end sections so that they will not bulge outwardly because of the earth within the frame, such sections are reenforced. Preferably the top edge of each section is reversely bent on its inner face, as indicated at 20 in Fig. 3, thus materially stiffening said top edge. Moreover, the reverse bends place the cut ends of the transverse wires of the mesh in a location where a gardener in working in the earth within the frame will not scratch his hands on such ends. The bottom edge of each section is preferably reenforced by bending the wire mesh horizontally inwardly to provide a foot 21 upon which the sections will firmly rest. The foot 21 may also be reversely bent, as indicated at 22, to provide further reenforcement and stiffening.

Since the side sections 10 are the longer, and consequently would have a greater tendency to bulge outwardly when the frame is filled with earth, further reenforcement for such side sections may be provided by means of sheet metal angle members 23 extending longitudinally of the side sections and preferably intermediate the top and bottom edge thereof. Each angle member has one leg rigidly secured to the wire mesh as by soldering or spot welding, and the other leg extending substantially horizontally inward of the frame. The horizontal leg, for further stiffening, may be bent upon itself, as indicated at 24. To definitely prevent any bulging of the side sections 10, tie rods 25 may be utilized, such tie rods being placed at spaced points and having their ends bent downwardly for insertion in apertures 26 punched in the horizontal legs of the angle members.

In the case of a mound over a double grave, the same side sections 10 may be used, but longer end sections are employed. Such end sections may be stiffened by angle members similar to the members 23, if desired.

In the modified form of the device shown in Fig. 4, the interlocking strips on the ends of the sections are of a simplified form. In this form the interlocking strip on each side section 10 comprises a U-shaped portion 30 having one arm of the U extended, as at 31. The wire mesh is then rigidly secured to the inner face of the extended arm 31 as by soldering or spot welding. The sheet metal strip on each end section comprises a U-shaped portion 32 interlocked with the U-shaped portion 30, and a straight portion 33 positioned at right angles to the U-shaped portion 32. The wire mesh is attached as by soldering or spot welding to the inner face of the straight portion 33.

In building a mound utilizing a device embodying the invention, the four sections are assembled merely by slidably connecting the U-shaped portion of the sheet metal strips at the end of the wire mesh sections. The four sections are thus rigidly held together. The tie rods 25 are inserted to hold the side sections 10 in properly spaced relation throughout their length. All this work may be readily performed at the grave without the use of any tools. Further, the foot 21 assists in supporting the various sections in upright position, as well as serving to stiffen them.

The sections thereby form a frame which is filled with earth, as indicated in Fig. 1, to the level of the top edge of the various sections. The earth is forced in under the sloping side sections, and the size of the mesh thereof is sufficient to prevent any detrimental erosion of the earth by rains. In other words, the support rendered to the earth by the mesh prevents the rains from washing it away. Grass seed is then planted in the earth underlying the sloping side sections, and the grass grows outwardly through the mesh thereof. When the grass attains its growth, it practically conceals the sections. The roots of the grass cooperate with the mesh in holding the earth in place. Since the sections lie flat against the earth, the grass on such surfaces may be clipped or cut in any usual manner without interference with the cutting device. The earth embeds the tie rods 25 and since the reenforcing angle members 23 are on the inner face of the wire mesh, these are likewise hidden. The top surface of the earth may be planted either with grass or utilized as a flower bed.

From the foregoing description, it will be evident that I have provided a novel structure for preventing dirt from being washed away by rains from sloping surfaces such as mounds over a grave. The device is sufficiently rigid to hold any desired form and the parts thereof, because of the attaching strips, are rigidly secured together but no tools are required for such assembly, thus making the device particularly adaptable for installation by a gardener. In filling in the earth within the framework, the gardener is in no danger of scratching his arms or hands on the ends of the wire of the mesh, and the grass growing over the device may be cut in any usual manner. It is also evident that I have provided a novel method of building a grave mound having sloping side surfaces covered by growing grass.

I claim as my invention:

1. A device of the character described comprising a pair of side sections and a pair of end sections arranged when joined to form a rectangular space with sloping surfaces, each section comprising a strip of wire mesh cut in trapezoidal form with its slanting edges provided with means for interlocking each such edge with the edge on the adjacent section, said means being connectable with the adjacent means by a longitudinal sliding movement, the parallel edges of the sections being bent to stiffen the sections, and each side section having an angle reenforcing strip intermediate its top and bottom edge, and tie rods connecting said reenforcing strips to hold said side sections uniformly spaced.

2. A device of the character described comprising a pair of side sections and a pair of end sections arranged when joined to form a rectangular space with sloping side and end surfaces, each section comprising a strip of wire mesh, the end edges of each strip having sheet metal strips formed to cover the ends of the wire mesh, each sheet metal strip being reversely bent to provide a U-shaped slide interlocking with the corresponding part of the strip on the adjacent section whereby the sections may be rigidly secured to each other by relative movement longitudinally of the sheet metal strips.

3. A device of the character described comprising a pair of end sections and a pair of side sections, each section comprising wire mesh cut to trapezoidal shape to provide when joined with the other sections a rectangular frame with downwardly and outwardly sloping slides and ends, the sections being provided at their ends with interlocking means to hold them together, each section having its top edge reversely bent for reenforcement and to place the cut ends of the wire in an out-of-the-way position, the lower edge of each section being bent horizontally inwardly to provide a foot adapted to rest on the ground, each side section having a reenforcing member located intermediate its top and bottom edge and comprising a strip of sheet metal bent to an angle in cross section with one leg rigidly attached flat against the wire mesh and the other leg extending inwardly and having longitudinally spaced holes, and tie rods connecting the side sections intermediate their ends, each tie rod having its ends bent downwardly for insertion in said holes.

BRUNO J. LAKE.